United States Patent [19]
Aaron et al.

[11] Patent Number: 6,111,371
[45] Date of Patent: Aug. 29, 2000

[54] SWITCH CONTROL SIGNAL GENERATOR

[75] Inventors: William Benjamin Aaron, Greenwood; Ronald Eugene Fernsler, Indianapolis, both of Ind.

[73] Assignee: Thomson multimedia S.A., Boulogne, France

[21] Appl. No.: 09/130,820

[22] Filed: Aug. 7, 1998

[51] Int. Cl.[7] .............................. G09G 1/04; H01J 29/70
[52] U.S. Cl. .......................... 315/408; 315/367; 315/399
[58] Field of Search ................................. 315/408, 367, 315/369, 399

[56] References Cited

U.S. PATENT DOCUMENTS

| | | | |
|---|---|---|---|
| 5,250,902 | 10/1993 | Williams et al. | 324/320 |
| 5,434,484 | 7/1995 | Murakami | 315/371 |
| 5,714,849 | 2/1998 | Lee | 315/408 |
| 5,929,574 | 7/1999 | Kim et al. | 315/370 |
| 6,008,749 | 12/1999 | Smith | 341/163 |

*Primary Examiner*—Seungsook Ham
*Assistant Examiner*—John Patti
*Attorney, Agent, or Firm*—Joseph S. Tripoli; Joseph J. Laks; Sammy S. Henig

[57] ABSTRACT

A scan frequency detector is responsive to a horizontal synchronization signal to generate a data signal that is indicative of the horizontal scan frequency. A digital-to-analog (D/A) converter produces from the data signal an analog, output signal at a first level, when the horizontal frequency is within a first range of values, at a second level, when the horizontal frequency is within a second range of values and at a third level, when the horizontal frequency is within a third range of values. A first switch of a switched S-capacitor arrangement, is turned on, when the output signal is at the first level. The first switch and a second switch of the switched S-capacitor arrangement, are turned on, when the output signal is at the second level. Both the first and second switches are turned off, when the output signal is at the third level. The third and second levels are distinguished by a level detector that includes a zener diode.

7 Claims, 1 Drawing Sheet

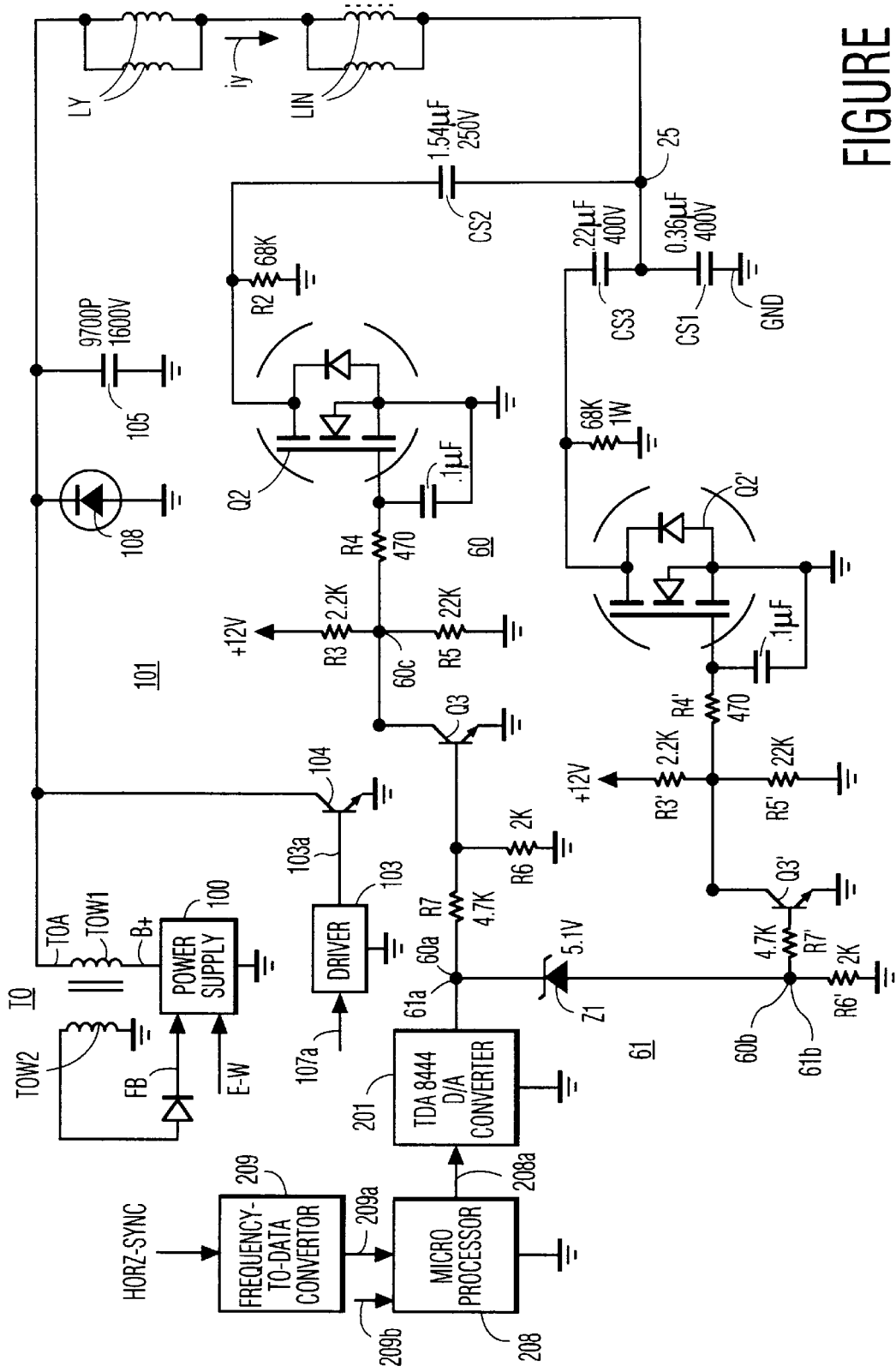

SWITCH CONTROL SIGNAL GENERATOR

The invention relates to a switch control arrangement of a deflection circuit. For example, the switch control arrangement may be used for controlling the switches of switched S-capacitors.

A television receiver, computer or monitor may have the capability of selectively displaying picture information in the same color cathode ray tube (CRT) using a deflection current at different horizontal scan frequencies. When displaying the picture information of a television signal defined according to a broadcasting standard, it may be more economical to utilize a horizontal deflection current at a rate of approximately 16 KHz, referred to as the 1 $f_H$ rate. Whereas, when displaying the picture information of a high definition television signal or a display monitor data signal, the rate of the horizontal deflection current may be equal to or greater than 32 KHz, referred to as 2 $nf_H$. The value n is equal to or greater than 1.

Typically, an S-capacitor is coupled to a horizontal deflection winding of a horizontal deflection circuit output stage to correct a deflection related beam landing error referred to as S correction. In a horizontal deflection circuit output stage of a video display monitor capable of operating at multi-scan rates, it is known to vary the number of in-circuit S-capacitors using switched S-capacitors. The selection of the S-capacitors is made via selectable switches, in accordance with the selected horizontal deflection frequency.

In one prior art, a microprocessor is responsive to a horizontal synchronization signal for generating a data signal containing a digital word that is determined by the selected horizontal frequency. The data signal is coupled to an input port of an integrated circuit (IC) that includes several digital-to-analog (D/A) converters. A given D/A converter may generate an output control signal that is coupled to the deflection circuit for adjusting a deflection paramenter, for example, picture width. The output control signals produced by the D/A converters are developed at separate output terminals of the IC.

It may be desirable to utilize the D/A converters for generating switch control signals for selecting the S-capacitors in accordance with the horizontal frequency. It may be desirable to reduce the required number of D/A converters and the corresponding output terminals of the IC for a given number of S-capacitors.

In carrying out an inventive feature, a given D/A converter generates an output signal having a multilevel or a number of selectable levels or states greater than two. For example, the output signal may be a tri-level signal. The multilevel signal is coupled to control terminals of first and second S-capacitor switches, advantageously establishing three combination states of the S-capacitor switches.

In a video display apparatus, embodying an inventive feature, a synchronization signal has a frequency selected from a range of deflection frequencies. A deflection circuit is responsive to the synchronization signal for generating a deflection current in a deflection winding. A source of a data signal having a value that is indicative of the selected deflection frequency is generated. A digital-to-analog converter responsive to the data signal generates an analog output voltage at a first level, when a first deflection frequency is selected, and at a second level, when a second deflection frequency is selected. A transistor switch is responsive to the digital-to-analog converter output voltage for selectively coupling, in accordance with the first and second levels of the digital-to-analog converter output voltage, an S-capacitance to the deflection circuit to provide for S-correction.

The sole FIGURE illustrates switched S-capacitor control circuit, embodying an aspect of the invention.

The sole FIGURE illustrates a horizontal deflection circuit output stage 101 of a television receiver having multi-scan frequency capability. Stage 101 is energized by a regulated power supply 100 that generates a supply voltage B+. A conventional driver stage 103 is responsive to an input signal 107a at the selected horizontal scanning frequency $nf_H$. Driver stage 103 generates a drive control signal 103a to control the switching operation in a switching transistor 104 of output stage 101. By way of example, a value of n=1 may represent the horizontal frequency of a television signal according to a given standard such as a broadcasting standard. The collector of transistor 104 is coupled to a terminal T0A of a primary winding T0W1 of a flyback transformer T0. The collector of transistor 104 is also coupled to a retrace capacitor 105. The collector of transistor 104 is additionally coupled to a horizontal deflection winding LY to form a retrace resonant circuit. The collector of transistor 104 is also coupled to a conventional damper diode 108. Winding LY is coupled in series with a linearity inductor LIN and a non-switched trace or S-capacitor CS1. Capacitor CS1 is coupled between a terminal 25 and a reference potential, or ground GND such that terminal 25 is interposed between inductor LIN and S-capacitor CS1.

Output stage 101 is capable of producing a deflection current iy. Deflection current iy has substantially the same predetermined amplitude for any selected horizontal scan frequency of signal 103a selected from a range of 2 $f_H$ to 2.4 $f_H$ and for a selected horizontal frequency of 1 $f_H$. Controlling the amplitude of deflection current iy is accomplished by automatically increasing voltage B+ when the horizontal frequency increases, and vice versa, so as to maintain constant amplitude of deflection current iy. Voltage B+ is controlled by a conventional regulated power supply 100 operating in a closed-loop configuration via a feedback winding T0W2 of transformer T0. The magnitude of voltage B+ is established, in accordance with a rectified, feedback flyback pulse signal FB having a magnitude that is indicative of the amplitude of current iy. A vertical rate parabola signal E-W is generated in a conventional way, not shown. Signal E-W is conventionally coupled to power supply 100 for producing a vertical rate parabola component of voltage B+ to provide for East-West distortion correction.

A switching circuit 60 is used for correcting a beam landing error such as linearity. Circuit 60 selectively couples none, only one or both of a trace capacitor CS2 and a trace capacitor CS3 in parallel with trace capacitor CS1. The selective coupling is determined as a function of the range of frequencies from which the horizontal scan frequency is selected. In switching circuit 60, capacitor CS2 is coupled between terminal 25 and a drain electrode of a field effect transistor (FET) switch Q2. A source electrode of transistor Q2 is coupled to ground GND. A protection resistor R2 that prevents excessive voltage across transistor Q2 is coupled across transistor Q2.

A control signal 60a is generated in a digital-to-analog (D/A) converter 201. Control signal 60a is coupled via a voltage divider that includes a resistor R7 and a resistor R6 to a base electrode of a threshold determining transistor Q3. An intermediate terminal 60c disposed between a resistor R3 and a resistor R4, forming a pull-up voltage divider, is coupled to the collector of transistor Q3 and, via a protection resistor R4 to a gate electrode of transistor Q2. When control signal 60a is sufficiently large to turn on transistor Q3, the gate voltage of transistor Q2 is zero and transistor Q2 is turned off. On the other hand, when control signal 60a is not sufficiently large to turn on transistor Q3, the gate voltage of transistor Q2 is pulled up by the voltage produced via resistors R3 and R5 and transistor Q2 is turned on.

In switching circuit 60, capacitor CS3 is coupled between terminal 25 and a drain electrode of a FET switch Q2'. FET switch Q2' is controlled by a control signal 60b in a similar way that FET switch Q2 is controlled by control signal 60a. Thus, resistors R3', R4' and R5' and transistor Q3' are coupled to one another and perform similar functions as resistors R3, R4 and R5 and transistor Q3, respectively.

A control circuit 61, embodying an inventive feature, includes a microprocessor 208 that is responsive to a data signal 209a generated in a frequency-to-data signal converter 209. Signal 209a has a numerical value that is indicative of the frequency of a synchronizing signal HORZ-SYNC or deflection current iy. Converter 209 includes, for example, a counter that counts the number of clock pulses, during a given period of signal HORZ-SYNC and generates word signal 209a in accordance with the number of clock pulses that occur in the given period. Microprocessor 208 generates a control data signal 208a that is coupled to an input of D/A converter 201. The value of signal 208a is determined in accordance with the horizontal rate of signal HORZ-SYNC. D/A converter 201 generates, in accordance with data signal 208a, analog control signal 60a at a single terminal 61a. Signal 60a is at a level that is determined by signal 208a, in accordance with the frequency of signal HORZ-SYNC. Alternatively, the value of signal 208a may be determined by a signal 209b that is provided by a keyboard, not shown.

In carrying out an inventive feature, signal 60a is coupled via a threshold determining arrangement of a zener diode Z1 coupled in series with resistor R6' to develop switch control signal 60b at a terminal 61b. Signal 60b is developed between diode Z1 and resistor R6'. Signal 60b is coupled to the base of transistor Q3' via a base resistor R7'. As explained before, signal 60a controls transistor Q3. Whereas, signal 60b controls transistor Q3'.

When the frequency of horizontal deflection current iy is 1 $f_H$, signal 60a is at a minimum level of zero volts such that the base voltage of transistor Q3 does not exceed the forward voltage of transistor Q3. Consequently, both transistors Q3 and Q3' are turned off and transistors Q2 and Q2' are turned on. The result is that both Scapacitors CS2 and CS3 are in-circuit S-capacitors that are coupled in parallel with non-switched S-capacitor CS1 and establish a maximum S-capacitance value.

When the frequency of horizontal deflection current iy is equal to or greater than 2 $f_H$ and less than 2.14 $f_H$ signal 60a is at an intermediate level of 5V such that the base voltage of transistor Q3 exceeds the forward voltage of transistor Q3. However, the level of signal 60a does not exceed the breakdown voltage of zener diode Z1. Consequently, transistor Q3 is turned on, transistor Q3' is turned off, transistor Q2 is turned off and transistor Q2' is turned on. The result is that S-capacitor CS2 is decoupled from non-switched S-capacitor CS1 and S-capacitor CS3 is coupled to S-capacitor CS1 to establish an intermediate S-capacitance value.

When the frequency of horizontal deflection current iy is equal to or greater than 2.14 $f_H$, signal $60_a$ is at a maximum level of 10V such that the base voltage of transistor Q3 exceeds the forward voltage of transistor Q3. Also, the level of signal 60a exceeds the breakdown voltage of zener diode Z1 by a sufficient amount to produce a base voltage of transistor Q3' that exceeds the forward voltage of transistor Q3'. Consequently, transistors Q3 and Q3' are turned on and transistors Q2 and Q2' are turned off. The result is that S-capacitors CS2 and CS3 are decoupled from non-switched Scapacitor CS1 and establish a minimum S-capacitance value.

Advantageously, D/A converter 201 generates a multilevel output signal 60a having selectable levels or states greater than two, i.e., a trilevel output signal. Advantageously, the tri-level signal establishes three selectable combination states of S-capacitor switch transistors Q2 and Q2' as follows: both transistors being turned off, both being turned on and only one of the transistors, transistor Q2, being turned on.

Advantageously, the usage of D/A converter 201 for controlling S-capacitor switching simplifies the receiver control arrangement. This is so because D/A converter 201 can be included in an integrated circuit that includes other D/A converters, not shown. The other D/A converters can be used for other adjustment control functions that do not require switching operation. Thus, there is no need for treating the switching function of the S-capacitors in a way different from non-switching control functions that provide adjustments.

What is claimed is:

1. A video display apparatus, comprising:
   a synchronization signal having a frequency selected from a range of deflection frequencies;
   a deflection circuit responsive to said synchronization signal for generating a deflection current in a deflection winding and for generating a correction signal to correct a beam landing error of an electron beam in a cathode ray tube;
   a source of a data signal having a value that is indicative of said selected deflection frequency;
   a digital-to-analog converter responsive to said data signal for generating at a terminal an output signal having at least three selectable levels, where at a first level, a first deflection frequency is selected, where at a second level, a second deflection frequency is selected and where at a third level, a third deflection frequency is selected; and
   a plurality of switches, each being responsive to a given digital-to-analog output signal level, for selectively coupling corresponding impedances to said deflection circuit to establish said beam landing error correction signal, in accordance with a selected combination of states of said switches, such that first, second and third combination of states is selected in accordance with said first, second and third levels, respectively, of said digital-to-analog converter output signal.

2. A video display apparatus according to claim 1 further comprising, a threshold detector responsive to said digital-to-analog converter output signal for generating a first switch control signal at a control terminal of one of said switches that causes said one switch to at a first state, when said digital-to-analog converter output signal at said first level, and at a second state, when said digital-to-analog converter output signal is at each of said second and third levels.

3. A video display apparatus according to claim 2 wherein said threshold detector comprises a zener diode.

4. A video display apparatus according to claim 2 wherein said digital-to-analog converter output signal is coupled to a control terminal of the other one of said switches that causes the other one switch to be at said first state, when said digital-to-analog converter output signal is at each one of said first and second levels, and at said second state, when said digital-to-analog converter output signal is at said third level.

5. A video display apparatus according to claim 1 wherein said selected impedances comprise S-capacitances.

6. A video display apparatus according to claim 1 wherein said data signal source comprises a frequency-to-data converter responsive to said synchronization signal.

7. A video display apparatus, comprising:

a synchronization signal having a frequency selected from a range of deflection frequencies;

a deflection circuit responsive to said synchronization signal for generating a deflection current in a deflection winding;

a source of a data signal having a value that is indicative of said selected deflection frequency;

a digital-to-analog converter responsive to said data signal for generating an analog output voltage at a first level, when a first deflection frequency is selected and at a second level, when a second deflection frequency is selected; and a transistor switch for S-swithing responsive to said digital-to-analog converter output voltage for selectively coupling, in accordance with said first and second levels of said digital-to-analog converter output voltage, an S-capacitance to said deflection circuit to provide for S-correction.

\* \* \* \* \*